(12) United States Patent
Yano

(10) Patent No.: US 9,148,536 B2
(45) Date of Patent: Sep. 29, 2015

(54) DISPLAY CONTROL APPARATUS AND DISPLAY CONTROL METHOD

(75) Inventor: Tomohiro Yano, Yokohama-shi (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 1178 days.

(21) Appl. No.: 12/964,288

(22) Filed: Dec. 9, 2010

(65) Prior Publication Data

US 2011/0154189 A1 Jun. 23, 2011

(30) Foreign Application Priority Data

Dec. 21, 2009 (JP) ................. 2009-289654

(51) Int. Cl.
*G06F 17/00* (2006.01)
*H04N 1/00* (2006.01)
(Continued)

(52) U.S. Cl.
CPC ....... *H04N 1/00442* (2013.01); *H04N 1/00453* (2013.01); *H04N 1/00458* (2013.01);
(Continued)

(58) Field of Classification Search
CPC ............. H04N 1/00442; H04N 1/215; H04N 1/00127; H04N 1/00132; H04N 2201/325; H04N 2201/3226; H04N 2201/3247; H04N 1/453; H04N 1/458; H04N 1/2112; H04N 1/32358; H04N 2201/00; H04N 2201/3298; H04N 2201/3288; G06F 3/0481; G06F 3/0482; G06F 3/0485; G06F 3/04817; G06F 17/211; G06F 17/2264; G06F 17/30132; G06F 17/30277; G06F 17/30899; G06F 17/30902; G06F 12/0862; G02B 21/367; G09G 2340/04

USPC ......... 715/205, 234, 243, 764, 784, 786, 788, 715/835, 838, 273, 209, 810; 345/156, 173, 345/530; 358/1.13, 1.15; 707/706, E17.12, 707/999.01; 709/203, 204, 217; 382/187; 348/333.01, 333.02, 333.05, 333.11, 348/333.12
See application file for complete search history.

(56) References Cited

U.S. PATENT DOCUMENTS 5,819,301 A \* 10/1998 Rowe et al. ................ 715/235
5,878,223 A \* 3/1999 Becker et al. ............. 709/223
(Continued)

FOREIGN PATENT DOCUMENTS

JP 10-063455 3/1998
JP 2007-306291 11/2007

OTHER PUBLICATIONS

Definition of word "Interval", American Heritage College Dictionary, 4th Ed. © 2002, Houghton Mifflin Co., p. 726, 3 pages total.\*

*Primary Examiner* — Adam M Queler
*Assistant Examiner* — James H Blackwell
(74) *Attorney, Agent, or Firm* — Cowan, Liebowitz & Latman, P.C.

(57) ABSTRACT

A display control apparatus that controls to display images so that a plurality of images are assigned to each page changes display from a page being displayed to another page according to a user's operation. Here, the display control apparatus performs pre-reading in which images to be displayed in pages other than the page being displayed are read from a device storing the images and stored in a temporary memory unit while the page is being displayed. In the pre-reading, a predetermined number of images fewer than the number of images assigned to each page are pre-read for each page other than the page being displayed, in ascending order of distance of each page to the page being displayed.

14 Claims, 10 Drawing Sheets

(51) Int. Cl.
 *H04N 1/21* (2006.01)
 *H04N 1/32* (2006.01)
 *H04N 101/00* (2006.01)

(52) U.S. Cl.
 CPC ......... *H04N1/2112* (2013.01); *H04N 1/32358* (2013.01); *H04N 2101/00* (2013.01); *H04N 2201/3288* (2013.01); *H04N 2201/3298* (2013.01)

(56) References Cited

U.S. PATENT DOCUMENTS

| | | | |
|---|---|---|---|
| 6,085,226 A * | 7/2000 | Horvitz | 709/203 |
| 6,584,498 B2 * | 6/2003 | Nguyen | 709/219 |
| 6,647,534 B1 * | 11/2003 | Graham | 715/205 |
| 6,742,033 B1 * | 5/2004 | Smith et al. | 709/224 |
| 6,847,388 B2 * | 1/2005 | Anderson | 715/854 |
| 7,047,485 B1 * | 5/2006 | Klein et al. | 715/205 |
| 7,383,510 B2 * | 6/2008 | Pry | 715/745 |
| 7,467,137 B1 * | 12/2008 | Wolfe | 1/1 |
| 7,500,175 B2 * | 3/2009 | Colle et al. | 715/201 |
| 7,546,538 B2 * | 6/2009 | Shuping et al. | 715/760 |
| 7,659,905 B2 * | 2/2010 | Subramanian et al. | 345/530 |
| 7,721,308 B2 * | 5/2010 | Finger et al. | 725/37 |
| 7,962,711 B2 * | 6/2011 | Osborne et al. | 711/162 |
| 8,099,710 B2 * | 1/2012 | Hill et al. | 717/105 |
| 8,250,490 B2 * | 8/2012 | Fujiwara et al. | 715/851 |
| 8,261,205 B2 * | 9/2012 | Lee | 715/784 |
| 8,291,454 B2 * | 10/2012 | Gossweiler et al. | 725/43 |
| 8,359,545 B2 * | 1/2013 | Pixley et al. | 715/786 |
| 8,504,913 B2 * | 8/2013 | Marchant et al. | 715/255 |
| 8,564,623 B2 * | 10/2013 | Cohen et al. | 345/634 |
| 8,667,418 B2 * | 3/2014 | Chaudhri et al. | 715/835 |
| 2001/0024195 A1 * | 9/2001 | Hayakawa | 345/173 |
| 2001/0033303 A1 * | 10/2001 | Anderson | 345/854 |
| 2005/0144221 A1 * | 6/2005 | Shin et al. | 709/203 |
| 2007/0013708 A1 * | 1/2007 | Barcklay et al. | 345/557 |
| 2007/0022437 A1 * | 1/2007 | Gerken | 725/41 |
| 2007/0067305 A1 * | 3/2007 | Ives | 707/10 |
| 2007/0258695 A1 * | 11/2007 | Yoshikawa et al. | 386/46 |
| 2007/0268384 A1 | 11/2007 | Uchida et al. | |
| 2008/0163132 A1 * | 7/2008 | Lee et al. | 715/864 |
| 2008/0222570 A1 * | 9/2008 | MacLaurin et al. | 715/839 |
| 2008/0307364 A1 * | 12/2008 | Chaudhri et al. | 715/836 |
| 2010/0162126 A1 * | 6/2010 | Donaldson et al. | 715/738 |

\* cited by examiner

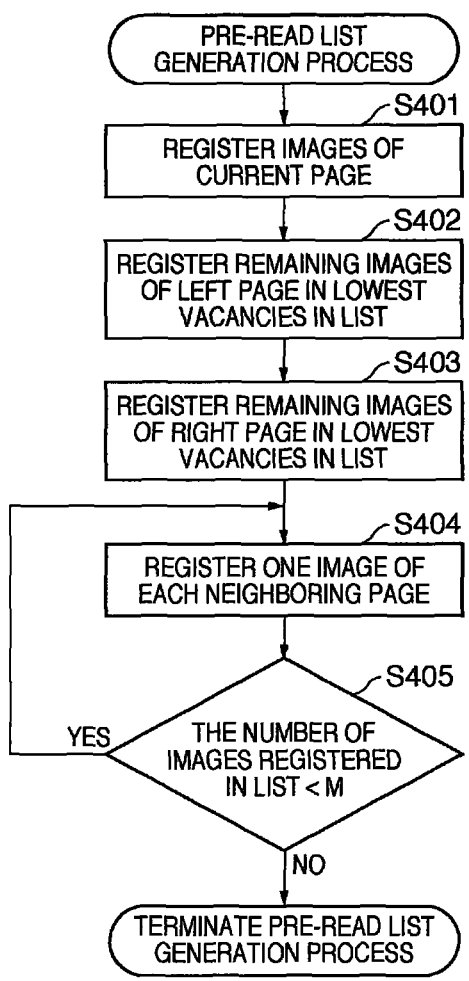

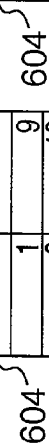
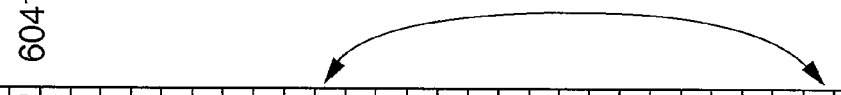

F I G. 9
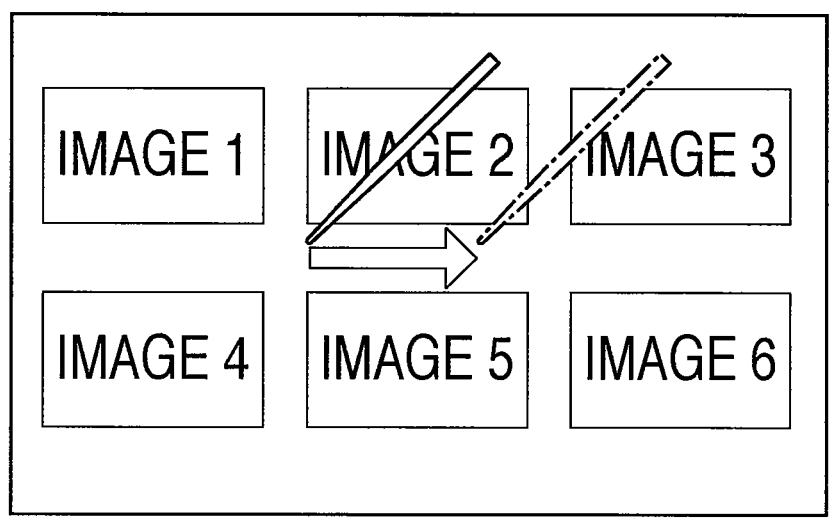

F I G. 10A
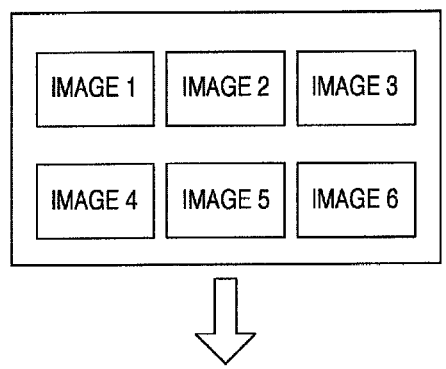
F I G. 10B
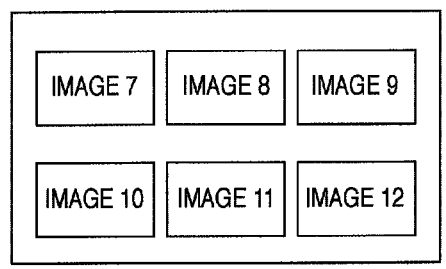
F I G. 10C
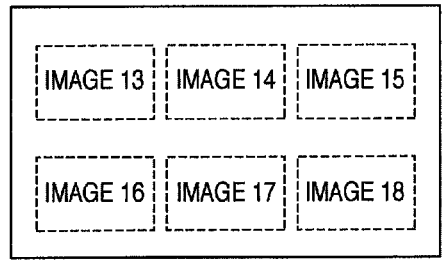

DISPLAY CONTROL APPARATUS AND DISPLAY CONTROL METHOD

BACKGROUND OF THE INVENTION

1. Field of the Invention

The present invention relates to a display control apparatus and a display control method in which a plurality of images are displayed on the same page.

2. Description of the Related Art

To display images with an image reproduction apparatus, the following method is generally used: a reading device reads image data directly or otherwise (e.g., communicatively) from a medium having images recorded therein; the image data is stored in a displayable form in a temporary memory device; the image is then displayed. Here, the task of reading the images via the reading device generally takes much time compared to the speed of reading the images from the temporary memory device. This is due to factors such as the difference in data transfer rate between the nonvolatile memory having the image data recorded therein and the temporary memory device, and the necessity of a decoding process before the compressed images are read in a displayable form into the temporary memory device. As such, when a user successively switches between displayed images, the reading task of the reading device may fail to keep up with the pace of the user's operation. Therefore, methods of predicting images to be displayed and reading the images in advance (pre-reading) have been proposed.

In such image pre-reading, how to pre-read appropriate images quickly is important. Exemplary conventional pre-reading approaches include the following. A technique described in Japanese Patent Laid-Open No. 2007-306291 (hereinafter referred to as document 1) uses an approach in which a plurality of images displayed in a screen are patched together and held as one image for image display according to the display size to thereby reduce the image reading time. A display control apparatus in Japanese Patent Laid-Open No. 10-63455 (hereinafter referred to as document 2) uses an approach in which, in order to allow swift switching between pages, a page that is likely to be displayed next is predicted, pre-read, and stored in memory.

However, if switching of the screen by a user operation is too fast relative to the reading time, pre-reading is likely to fall behind as the operation proceeds. For example, images are immediately displayed if the reading keeps up with the user operation, as in the case of switching from a screen in FIG. 10A (a screen in which images 1 to 6 are displayed) to the next screen, a screen in FIG. 10B (a screen in which images 7 to 12 are displayed). However, when the page is further switched in a short time to display a screen in FIG. 10C (a screen in which images 13 to 18 are displayed), the reading of images may fall behind. The dashed lines surrounding the images in FIG. 100 indicate that these images are not displayed yet because part of the processing of the display, such as the reading, has fallen behind. In such cases where the reading falls behind, it may be that no images are displayed as in FIG. 10C, and so the user does not obtain any hints as to what the displayed page, changed by the user's operation, represents. To know what the page represents, the user must wait for the completion of the reading of the images and the display of the images on the screen.

In the technique of document 1, generating the display image data at the time of recording images requires recording a large amount of display image data for display in an image recording medium, thereby requiring extra capacity in the medium. On the other hand, generating the display image data when images are displayed by a display device requires time for image generation in addition to the image reading time, thus requiring extra time in addition to the fundamental image reading time. This approach is also inconvenient in that a large area in a temporary memory device is necessary for generating and holding the display image data.

The technique of document 2 predicts the next page. Since image pre-reading is performed to read all images to be displayed in the predicted page, pre-reading over a wide range is not possible. Therefore, the technique is inconvenient in that the image reading speed soon falls behind in continuous page scrolling, resulting in no images being displayed on the screen.

SUMMARY OF THE INVENTION

The present invention has been made in view of the above inconveniences. According to an embodiment of the present invention, there are provided a display control apparatus and a display control method that can prevent a situation in which no images on a page are displayed upon a quick page-switching operation.

According to one aspect of the present invention, there is provided a display control apparatus comprising:

a display control unit configured to cause a display device to display images stored in a memory unit so that a plurality of images are assigned to each page;

a changing unit configured to change display from a page being displayed on the display device to another page; and a pre-read unit configured to read images to be displayed in a plurality of pages other than the page being displayed from the memory unit and store the read images in a temporary memory unit while the page is being displayed, wherein the pre-read unit reads, from the memory unit, a predetermined number of images, fewer than the number of images assigned to each page, for each of the plurality of pages other than the page being displayed, in ascending order of distance of each page to the page that is being displayed.

Also, according to another aspect of the present invention, there is provided a control method for a display control apparatus, comprising:

a display control step of causing a display device to display images stored in a memory unit so that a plurality of images are assigned to each page;

a changing step of changing display from a page being displayed on the display device to another page; and a pre-read step of reading images to be displayed in a plurality of pages other than the page being displayed from the memory unit and storing the read images in a temporary memory unit while the page is being displayed, wherein the pre-read step comprises reading, from the memory unit, a predetermined number of images fewer than the number of images assigned to each page for each of the plurality of pages other than the page being displayed, in ascending order of distance to the page being displayed.

Further features of the present invention will become apparent from the following description of exemplary embodiments with reference to the attached drawings.

BRIEF DESCRIPTION OF THE DRAWINGS

FIG. 4 is a flowchart showing a pre-read list generation process.

FIGS. 5A to 5C are diagrams illustrating the relationship between an image arrangement and images displayed in screens.

FIGS. 6A to 6H are diagrams schematically showing steps of generating a pre-read list.

FIG. 9 is a diagram schematically showing a user's page switching operation.

FIGS. 10A to 10C are diagrams schematically showing image display operation in a general display control apparatus.

DESCRIPTION OF THE EMBODIMENTS

A preferred embodiment of the present invention will be described below with reference to the accompanying drawings.

Figure 1:
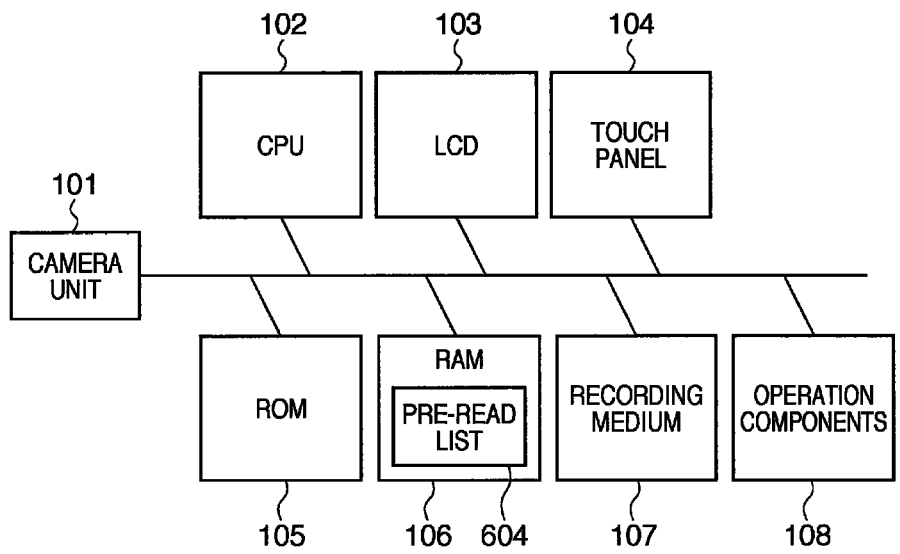
FIG. 1 is a block diagram showing a configuration of a digital video camera in an embodiment.

FIG. 1 is a block diagram showing a configuration of a digital video camera in the embodiment. A camera unit 101 includes: a sensor such as a CCD or CMOS sensor and a camera lens, all of which are necessary for shooting and imaging; a component such as a microphone, necessary for recording sound; and an encoder that encodes images and sound in a form such as MPEG-2. The camera unit 101 takes moving images and still images using these components. A CPU 102 is a system control unit, which controls the entire apparatus of the digital video camera. An LCD 103 is a display device on which OSD display of shot moving images and still images, a menu, and the like are provided.

A touch panel 104, which is attached on the LCD 103, can detect inputs of touch operations on images such as buttons displayed on the LCD 103, as well as flick and drag operations. In the digital video camera in the embodiment, operations such as changing a displayed page can be performed through flick and drag operations. A flick is an operation of quickly moving a finger by a certain distance with the finger kept on the touch panel, and then moving the finger off the touch panel. In other words, a flick is an operation of quickly rubbing the touch panel with a finger like tapping. This allows the display to be scrolled. In flick scrolling, an amount of scrolling corresponding to the moving distance or the moving speed of a finger touching the touch panel occurs even after the finger is removed from the touch panel.

A ROM 105 stores control programs for the CPU 102 and various sorts of fixed data. A RAM 106 may be SRAM or DRAM and stores program control variables and the like. The RAM 106 is also used as temporary memory for storing pre-read image data, various setting parameters, various working buffers, and the like. A recording medium 107 may be a hard disk or a memory card and stores files such as image files and image management files. Operation components 108 are input devices including hardware keys different from the touch panel 104, such as a power button, a recording button, a zoom lever, and a button for switching between a shooting mode and a playback mode.

Figure 2:
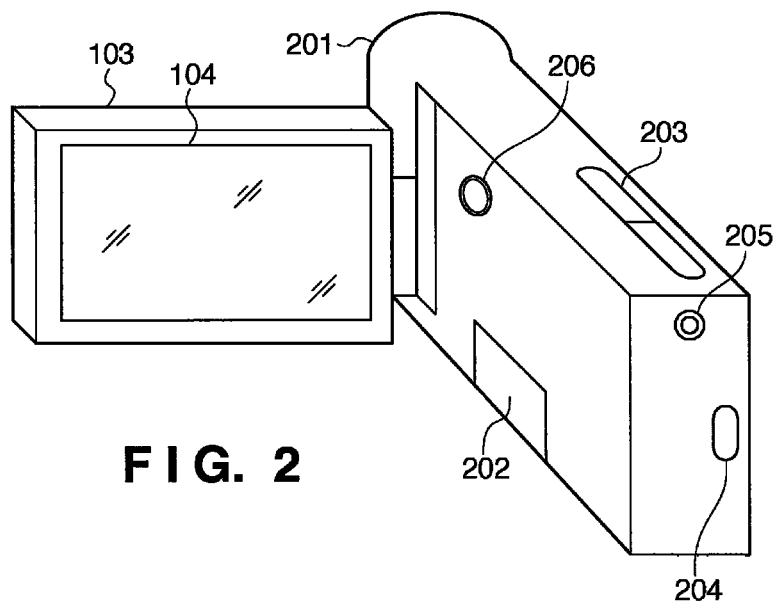
FIG. 2 is a diagram showing an external configuration of the digital video camera in the embodiment.

FIG. 2 is a diagram showing an external configuration of the digital video camera in the embodiment. Reference numeral 201 is housing for the camera unit 101. A medium insertion unit 202 accepts the removable recording medium 107. A zoom lever 203, a shooting start/stop button 204, a power switch 205, and a mode switching button 206 are included in the operation components 108. The zoom lever 203 is an operation component for operating the lens of the camera unit 101 to continuously change the angle of view. The shooting start/stop button 204 is an operation component for instructing the start and end of shooting. Pressing the shooting start/stop button 204 when shooting is not performed causes shooting to start, and pressing the shooting start/stop button 204 during shooting causes the shooting to stop. The power button 205 is an operation component for turning on/off the main power of the digital video camera. The mode switching button 206 is an operation component for switching between the playback mode and the shooting mode of the digital video camera.

In the digital video camera in the embodiment, images shot with the camera unit 101 are managed by number (image number). In the embodiment, the images are recorded in the recording medium 107 with numbers associated therewith in ascending order of shooting, in other words: image 1, image 2, etc. For example, a table that records correspondences between image numbers and image files is held in the recording medium 107. In the playback mode, the shot images can be individually displayed full-screen on the LCD 103 and can also be displayed in a page in which a plurality of images are arranged as one unit on the LCD 103. In the page-based display, images arranged as a matrix with three columns by two rows, a total of six images, can be simultaneously displayed on one screen (one page).

Figures 5A, 5B, 5C:
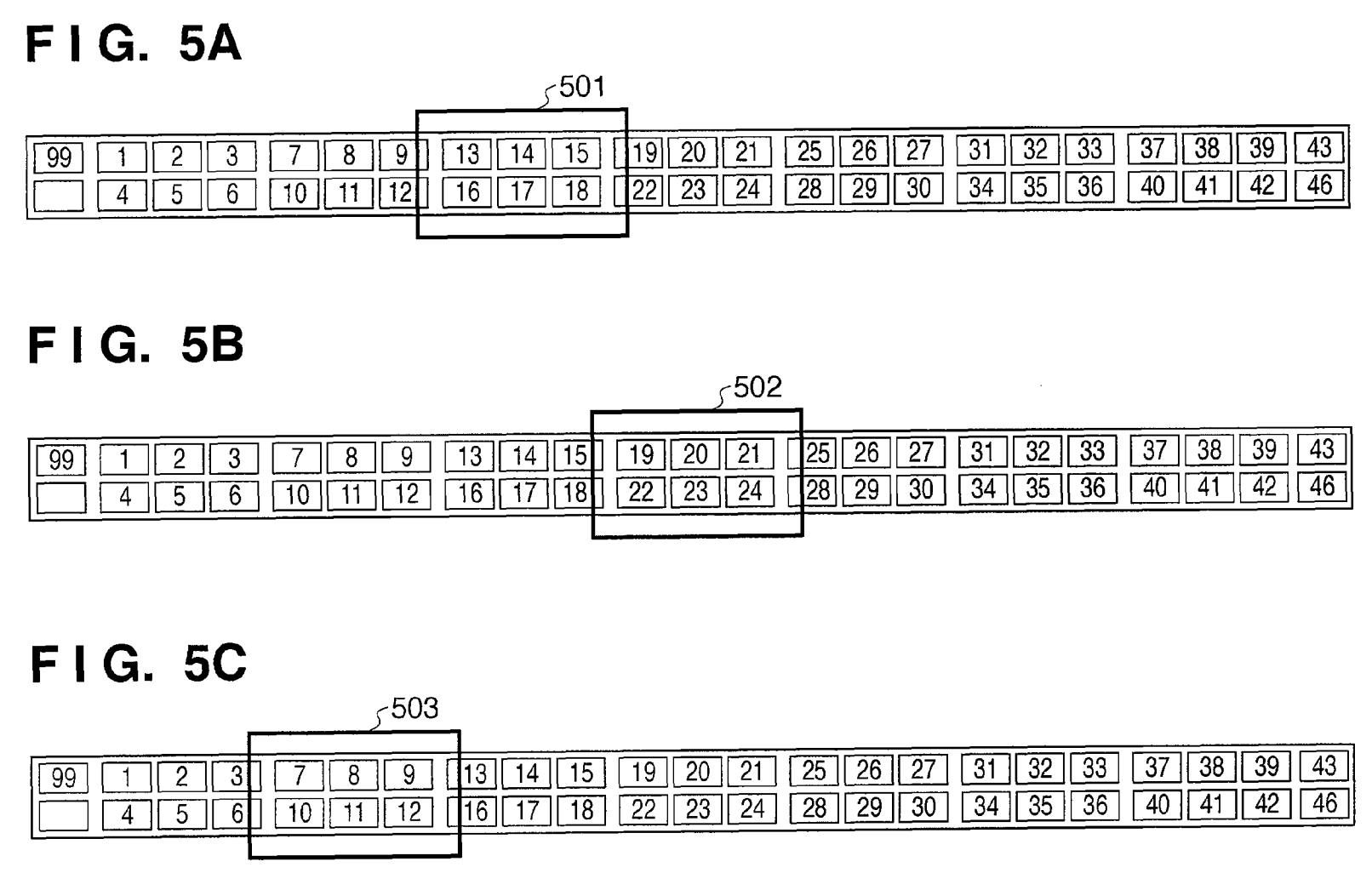

FIGS. 5A to 5C show schematic diagrams of pages that are virtually-combined in an order in which the pages are switched by a page switching operation. Images being displayed on the LCD 103 are, in FIG. 5A for example, images in a range 501. That is, images being simultaneously displayed are part of recorded images. In the embodiment, 100 images are recorded, out of which ten images are simultaneously displayed (four of the ten images are only partially displayed). A page to the left of an image 1 loops to the last page of the images, so that an image 99 is located to the left of the image 1 in FIGS. 5A to 5C. The range 501 is a portion being displayed on the LCD. At this point, leftmost images 9 and 12 and rightmost images 19 and 22 are partially visible images in adjacent pages. For example, when the page is switched to display the position of a range 502 (FIG. 5B), which is the next page, the images 19 and 22 are completely displayed.

The positions of the pages displayed on the LCD 103 are predetermined, so that six images completely displayed are regarded as one unit. In the range 501, images 13 to 18 are arranged in ascending order of image number at positions on the screen of the LCD 103 in the following order: upper left, upper center, upper right, lower left, lower center, and lower right. The image 13 at the upper left follows the image 12 partially displayed at the leftmost position in the lower row on the LCD 103. The image 12 will be completely displayed at the lower right when the position of a range 503 (FIG. 5C), which is the left page (the previous page) with respect to the current page, is displayed.

Figure 3:
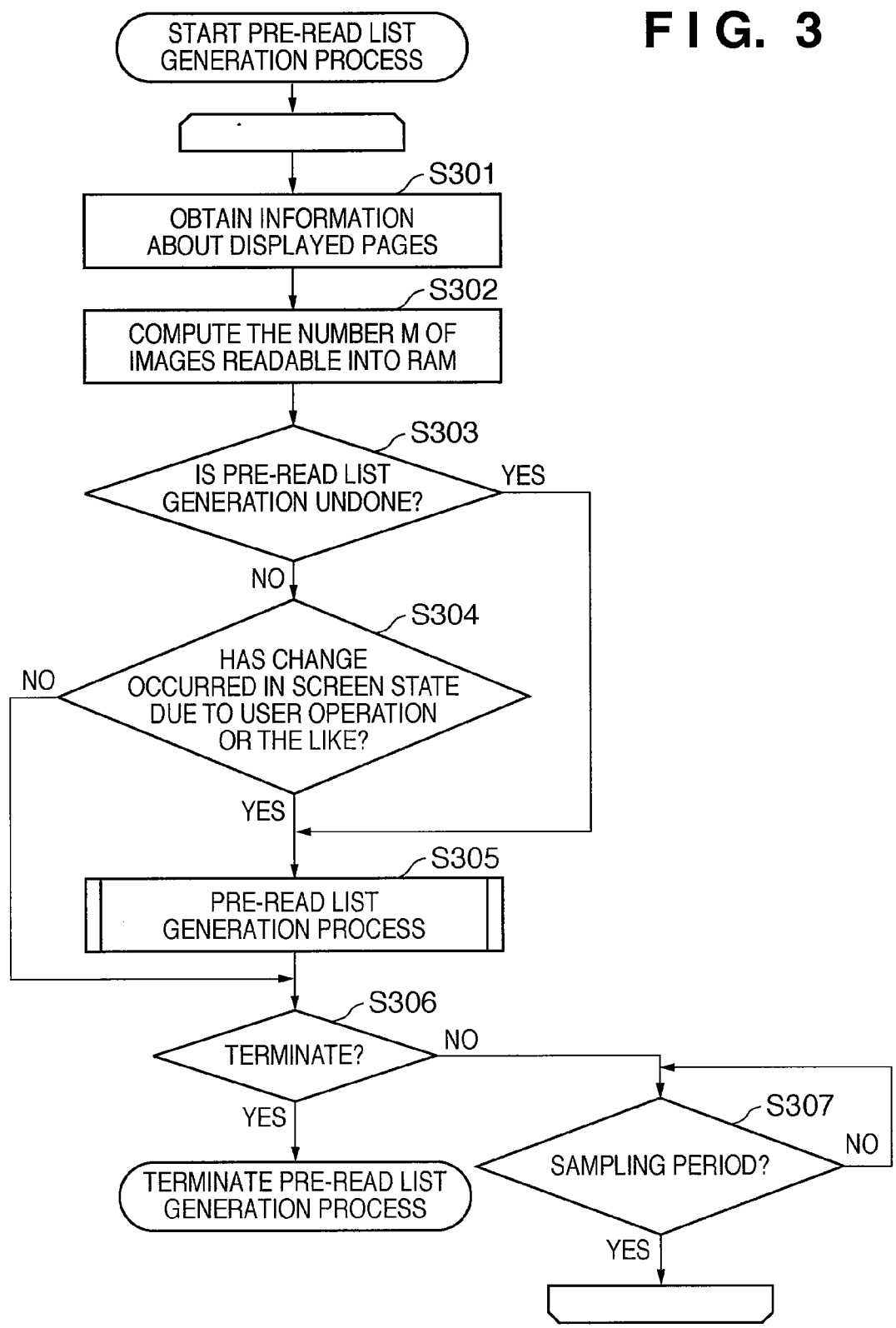
FIG. 3 is a flowchart showing a process in a playback mode in the embodiment.

Next, an image display process in the embodiment will be described where the mode switching button 206 is operated to switch from the shooting mode to the playback mode in the above-described digital video camera. FIG. 3 is a flowchart showing a process in the digital video camera upon switching to the playback mode. With reference to this flowchart, a procedure of generating a pre-read list in the embodiment will be described. Each process step of the flowchart is implemented by causing a program recorded in the ROM 105 to be loaded into the RAM 106 and executed by the CPU 102.

In S301, the CPU 102 obtains information about displayed pages. Exemplary page information includes the type of images to be displayed, the total number of images, page numbers, and the number of images to be displayed in each page. Thus, the CPU 102 obtains information required in image display and pre-reading. In S302, the CPU 102 computes the number M of readable images with respect to a capacity in the RAM 106. As the capacity allocated in the RAM 106, a predetermined area may be allocated in advance, or all memory areas available at this point may be allocated. In the embodiment, a capacity that allows pre-reading 30 images is allocated as a fixed area. That is, a fixed capacity such that M=30 is allocated as a temporary memory area for pre-reading. In this case, preset information indicating M=30 may be obtained from the ROM 105 or the RAM 106.

In S303, the CPU 102 determines whether a pre-read list has not been generated. If the pre-read list has not been generated, the process proceeds to pre-read list generation in S305. If the pre-read list has been generated, the process proceeds to S304. An exemplary case where the pre-read list has not been generated may be when this pre-read list generation process operates for the first time. In S304, the CPU 102 detects whether a change has occurred in the screen state due to the user's operation on the touch panel 104. For example, a slide operation (a flick) on images with a pen as in FIG. 9 is detected.

In S305, the CPU 102 generates a list of images to be pre-read (a pre-read list 604) in the RAM 106. Operations in this pre-reading step will be described later with reference to a flowchart in FIG. 4. Once the pre-read list 604 has been generated, in S306, the CPU 102 determines whether the playback mode is terminated. When the user operates the mode switching button 206 to switch to the shooting mode or operates the power switch 205 to turn the power off, the process is terminated. Otherwise, the process proceeds to S307, where the CPU 102 waits for a sampling period for updating screen information. Upon the sampling period, the process returns to S301 to repeat the above-described process (the process of generating the list depending on a change in the screen state).

FIG. 4 shows details of the pre-read list generation process in S305 of FIG. 3. Each process steps of a flowchart in FIG. 4 is implemented by causing a program recorded in the ROM 105 to be loaded into the RAM 106 and executed by the CPU 102.

In S401, the CPU 102 sequentially registers all images to be displayed in the currently displayed page (the range 501) at highest-priority positions in the pre-read list 604. For example, for the image arrangement as in FIG. 5A, the portion of the range 501 is being displayed in the LCD 103. In this case, the images to be displayed in the range 501 are registered in the pre-read list 604 as in FIG. 6A in the order of the images 9, 13 to 15, 19, 12, 16 to 18, and 22, starting from the upper left in the screen. Through this process, the images in the currently displayed page will be preferentially read and displayed on the LCD 103. This process is to register all the images in the currently displayed page in the pre-read list 604 first, because these images need to be immediately displayed. This process enables comfortable browsing after page switching.

In S402, the CPU 102 sequentially registers images to be completely displayed in the left page (the previous page) (the range 503) with respect to the currently displayed page (the range 501) in lowest-priority vacancies in the pre-read list 604. That is, among images in the range 503, images not registered yet in the pre-read list 604 except leftmost and rightmost images in the screen to be partially displayed are sequentially registered in the lowest-priority vacancies in the pre-read list 604. In the case of FIG. 5C, images 7, 8, 10, and 11 are registered in the pre-read list 604 starting from the lowest vacancy with no spaces between. Through the process in S402, the pre-read list transitions from the state in FIG. 6A to the state in FIG. 6B.

In S403, the CPU 102 sequentially registers images to be completely displayed in the right page (the next page) (the range 502) with respect to the currently displayed page (the range 501) in lowest-priority vacancies in the list. That is, among images in the range 502, images not registered yet in the pre-read list 604 except leftmost and rightmost images in the screen to be partially displayed are sequentially registered in the lowest-priority vacancies in the pre-read list 604. In the case of FIG. 5B, images 20, 21, 23, and 24 are registered in the pre-read list 604 starting from the lowest vacancy with no spaces between. Through the process in S403, the pre-read list 604 transitions from the state in FIG. 6B to the state in FIG. 6C. Since the pages immediately before and after the currently displayed page are likely to be displayed next as a result of page switching, the images to be completely displayed in the pages adjacent to the currently displayed page are pre-read in the above processes in s402 and S403. These processes enable comfortable browsing after page switching.

Further, in the image pre-reading according to the embodiment, one image is pre-read from each page other than the specific page being displayed, in ascending order of distance to the specific page. In S404, first, one image is pre-read from each page, starting from a page adjacent to the currently displayed page (the range 501) toward farther pages, and the images are sequentially registered in the highest vacancies in the pre-read list 604. In the embodiment, among images to be completely displayed in each page, an image to be placed at the upper left is sequentially registered in a vacancy in the pre-read list 604. That is, the CPU 102 registers images in the pre-read list 604 in such an order that a first image in a second page is read earlier than a second image in a first page, where the first page is different from the currently displayed page and the second page is farther than the first page from the currently displayed page.

This process will be described in detail. First, the image 19, which is one of the images 19 to 24 to be completely displayed in the next page (the range 502) with respect to the currently displayed page and which is to be placed at the upper left, is registered. Next, the image 7, which is one of the images 7 to 12 to be completely displayed in the previous page (the range 503) with respect to the currently displayed page and which is to be placed at the upper left, is registered. Then, the image 25, which is one of the images 25 to 30 to be completely displayed in a page two pages after the currently displayed page and which is to be placed at the upper left, is registered. Next, the image 1, which is one of the images 1 to 6 to be completely displayed in a page two pages before the currently displayed page and which is to be placed at the upper left, is registered. In the same manner, one image is registered from each page in an order of a page three pages after, a page three pages before, a page four pages after, a page four pages before, etc., with respect to the currently displayed page. Once one image has been registered from each of all the pages, a second image is sequentially registered from each page in ascending order of distance to the current page. This prevents empty pages from being displayed upon quick scrolling, as will be described later with reference to FIGS. 8A and 8B. The second image may be an image with an image number next to the image number of the first registered image in each page. However, this is not limiting. For example, the second image may be an image to be placed at the lower right among images to be completely displayed in each page. This is more preferable because the user can simply view the first and second images to estimate the range of the remaining images to be displayed in that page. Once the second image in each of all the pages has been registered, a third image and subsequent images in each page are registered in such an order that all images in each page would be ultimately registered.

Even if not all the images have been registered, the registration process is terminated when the number of registered images reaches M (when no more vacancies are available in the pre-read list 604) as a result of registering images in the above-described order. In the registration process, when an image already registered in the list in s401 to S403 is going to be registered at a higher-priority position, the position in the list is modified. If this modification creates a vacancy in the list, the entire listed images including those registered in ascending order of priority, registered at higher-priority positions than the created vacancy are slid in the lower-priority direction. This operation will be described in detail.

Figures 6A, 6B, 6C, 6D:

The image 19 to be completely displayed at the upper left in the right page (the range 502) with respect to the currently displayed page (the range 501) is registered in the list, and the pre-read list 604 transitions from the state in FIG. 6C to the state in FIG. 6D. However, since the image 19 is already registered at a priority 5, which is higher than a priority 11 at which the image 19 is now added, the image 19 registered at the priority 11 is deleted. Next, the image 7 is registered, and the pre-read list 604 transitions to the state in FIG. 6E. Although the image 7 is also already registered, the image 7 is registered at a lower priority 27 and the image 7 is now going to be registered at a higher priority 11. Therefore, the image 7 at the priority 27 is deleted from the pre-read list 604, and the pre-read list 604 transitions to the state of FIG. 6F. Since the priority 27 is vacant in the state of FIG. 6F, the images 20 to 24 above this vacancy are slid downward in the pre-read list 604 to make the pre-read list 604 transition to the state of FIG. 6G. In this manner, if an image is already registered in the pre-read list 604, the image at a higher-priority position is maintained in the list, and the registration is continued as long as there is a vacancy in the list. As images are further registered in vacancies in the pre-read list 604 one by one from respective pages in ascending order of distance to the currently displayed page as described above, the pre-read list 604 finally becomes a completion state as shown in FIG. 6H.

Returning to FIG. 4, the CPU 102 determines whether the pre-read list 604 has a vacancy in S405. In the embodiment, 30 images can be registered in the pre-read list 604. Therefore, if the number of current registered images has reached 30, the process is terminated. If the number of current registered images is smaller than M, the process returns to s404. By repeating S405 and S404, the CPU 102 registers any unregistered images from respective pages in vacancies in the pre-read list 604 in ascending order of distance to the current page. Once one image has been read from each of all the pages, one image with the next priority (for example, an image with the next smallest image number in each page) is pre-read from each page. In this manner, the process of pre-reading one image from each page is repeated.

Figure 7:
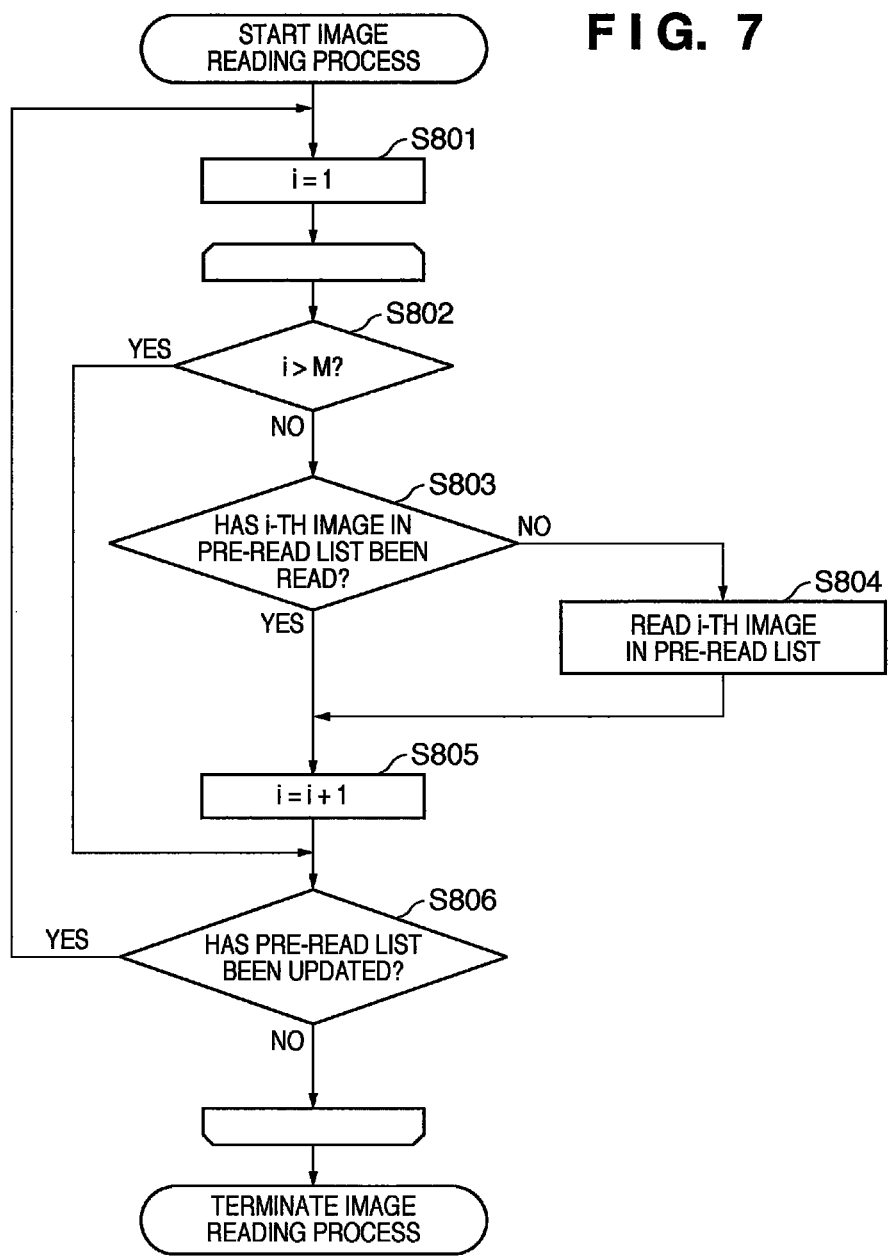
FIG. 7 is a flowchart showing a process of an image reading task.

Once the pre-read list 604 has been generated through the above-described procedure, a separate task, namely, an image reading task starts to operate. FIG. 7 is a flowchart showing a process of the image reading task. With reference to this flowchart, a procedure of the reading will be described.

In S801, the CPU 102 initializes a variable for use in the process of the image reading task. In S802, the CPU 102 determines whether or not the variable i is larger than the maximum number M for the pre-read list 604. If the variable i is larger than M, the process proceeds to S806. Otherwise, the process proceeds to S803. In S803, the CPU 102 determines whether an image at the i-th priority in the pre-read list 604 has been read into the temporary memory area in the RAM 106. If the image has been read, the image does not need to be read again and the process proceeds to S805. Otherwise, the process proceeds to S804.

If it is determined that the image at the i-th priority has not been read in the temporary memory area in the RAM 106, the CPU 102 reads the image at the i-th priority in the pre-read list 604 from the recording medium 107 in S804. The image at the i-th priority is an image with an image number corresponding to the i-th priority, and the image to be read is determined by, for example, referring to a table (recorded in the recording medium 107) that indicates correspondences between image numbers and image files. If i=1, the image 9 at the first priority in the pre-read list 604 generated in the pre-read list generation process is read from the recording medium 107 into the RAM 106. In S805, the CPU 102 increments the variable by one. In S806, the CPU 102 determines whether or not the pre-read list 604 has been updated. If it is determined that the pre-read list has been updated in the above-described pre-read list generation process, the CPU 102 returns the process to S801. If it is determined that the pre-read list 604 has not been updated, the CPU 102 returns the process to S802.

Figure 8A:
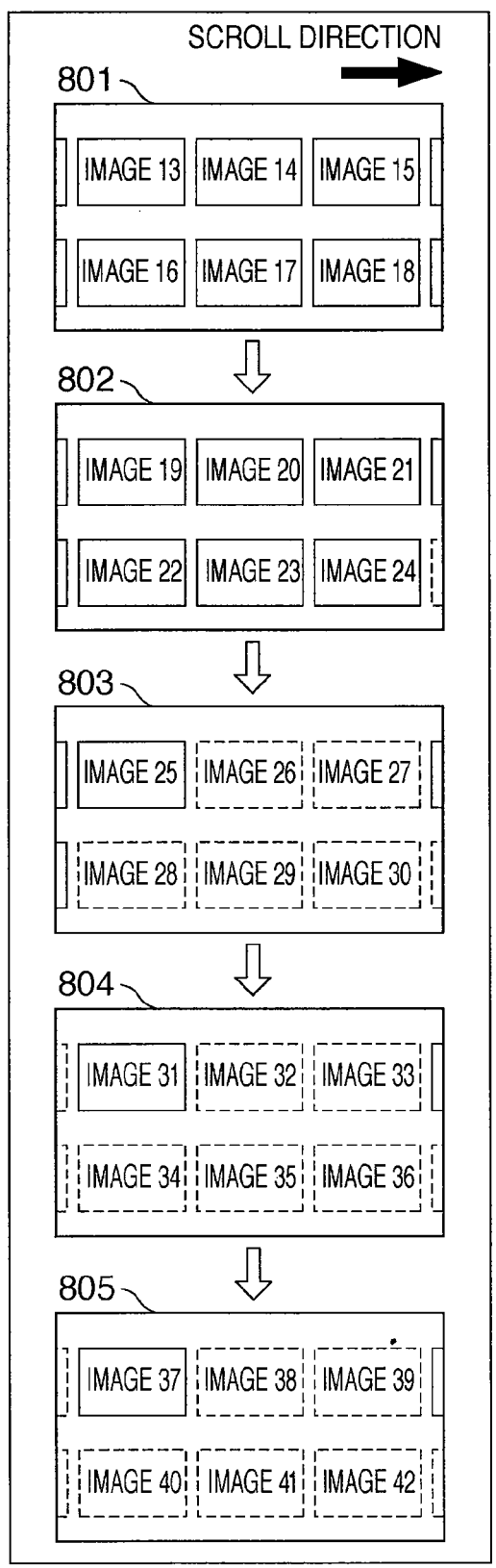
FIGS. 8A and 8B are diagrams showing exemplary screen display caused by scroll operations.

Thus, based on the pre-read list 604 generated in the pre-read list generation process, images are read from the recording medium 107 into the RAM 106. This reading includes reading out an image, performing decoding processing, and performing resizing processing according to a display size. FIG. 8A schematically shows images displayed on the LCD 103 after all the images registered in the pre-read list 604 are read and when pages are scrolled through by an operation of scrolling images on the touch panel 104 leftward (an operation of touching a pen to the touch panel 104 to move the images leftward). This operation causes the images to be moved (scrolled) to the left, so that the screen relatively moves to the right. A solid black arrow indicates the screen scroll direction. Transitions of the screen from a screen 801, to a screen 802, to a screen 803, to a screen 804, and to a screen 805 in FIG. 8A illustrate exemplary operation in a case where the processes of updating the pre-read list and reading images fall behind because of the scroll (the touch operation) which has been performed quickly. Images indicated by dashed lines (e.g., the images 26 to 30 in the screen 803) should have been displayed, but the images are not displayed because they have not yet been read. However, it can be seen that at least one image is displayed in the screen upon switching from the currently displayed page containing the images 13 to 18.

Figure 8B:
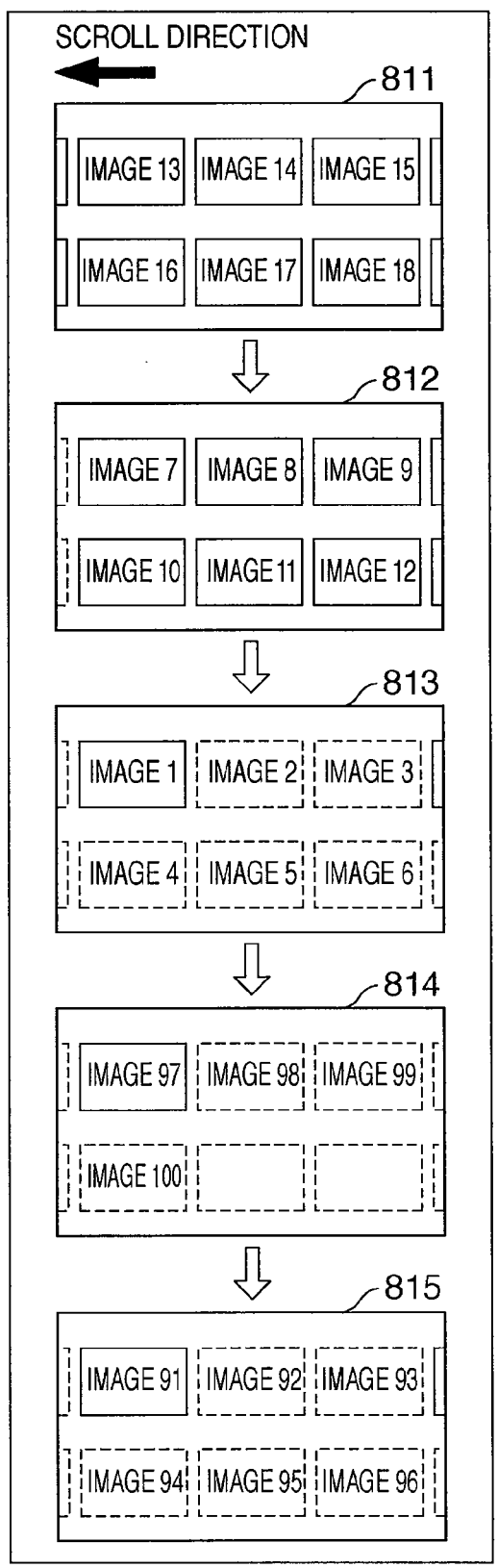

FIG. 8B schematically shows images displayed on the LCD 103 after all the images in the list are read and when pages are scrolled through by an operation of scrolling images on the touch panel 104 rightward. This operation causes the images to be moved (scrolled) to the right, so that the screen relatively moves to the left. The solid black arrow shown indicates the screen scroll direction. Transitions of the screen from a screen 811 to a screen 812, to a screen 813, to a screen 814, and to a screen 815 in FIG. 8B illustrates exemplary operation in a case where the processes of updating the pre-read list and reading images fall behind because of the scroll operation performed quickly. Images indicated by dashed lines (e.g., the images 2 to 6 in the screen 813) should have been displayed, but the images are not displayed because they have not yet been read However, it can be seen that at least one image is displayed in the screen upon switching from the currently displayed page containing the images 13 to 18.

Thus, since the digital video camera in the embodiment pre-reads images so that at least one image is displayed in the screen, a situation in which no images are displayed in the screen can be prevented. Therefore the user can obtain a hint for knowing what the displayed content changed by the user's operation represents, and can determine whether to perform a further operation without waiting for images to be displayed in the screen.

In the above embodiment, the example of applying the present invention to the digital video camera has been described. However, the present invention is not limited to this. For example, the present invention is applicable to various display control apparatuses, such as a digital camera as well as a personal computer, mobile phone, PDA, and digital photo frame without an imaging device. The present invention is also applicable to a case where web pages are scrolled through to view sequentially arranged images while the web pages are displayed by using an apparatus such as a personal computer, a mobile phone, or a PDA. In the above embodiment, the example has been described in which images are pre-read from the removable recording medium 107. However, the present invention is not limited to this. For example, if images are to be taken into the apparatus through a communication function from an external device having the images stored therein, the external device will be the source of pre-reading.

In the above embodiment, the approach of preferentially pre-reading the top image in each relevant page has been described by way of example. However, the present invention is not limited to this. For example, directory information such as a file number or a timestamp may be utilized to determine the image to be pre-read from each page. Alternatively, image information possibly recorded in the header of an image file, such as a file name or Exif information, may be extracted and recorded in a management file in advance, and the pre-reading priority in each page may be determined based on the image information recorded in the management file.

In the above embodiment, the type of an image to be pre-read may be predetermined for each page. For example, image information such as a name of a person or a location may be recorded in each image file and managed in a management file as described above. Then, an image of a particular location may be preferentially pre-read from each page. Here, the image to be preferentially pre-read may be a representative image in that page. If displayed images are map information, the image to be preferentially pre-read may be an image serving as a landmark in each page, such as a station or a park.

The above embodiment pre-reads at least one image from each page, so that a wide range of images can be pre-read in a short time. This prevents a situation in which no images are displayed when the user quickly performs a page switching operation. Therefore, although one image is pre-read at a time from each page in the above embodiment, two images may be pre-read at a time from the beginning, for example. That is, a predetermined number of images fewer than the number of displayed images assigned to each page (six in the above embodiment) may be pre-read at a time from each page.

In the above embodiment, even in the pre-reading of the second and subsequent images from each page, one image (or the predetermined number of images described above) is pre-read from each page. However, this is not limiting. After the process of pre-reading one image from each page, all the remaining images in each page may be pre-read at a time in ascending order of distance to the specific page being displayed. Alternatively, the number of images to be pre-read from each page may be varied. For example, one image may be pre-read from each page in the first iteration, two images may be pre-read from each page in the second iteration, and so on.

Although the touch panel is used to perform a page switching operation in the above embodiment, an operation using a physical switch, such as a mouse, arrow keys, or a dial key may be employed. As described above, in flick scrolling using a touch panel, a mouse or the like, an amount of scrolling corresponding to the moving distance or the moving speed of a finger touching the touch panel occurs even after the finger is removed from the touch panel. Therefore, a page determined to be displayed upon completion of the page switching by a flick operation may be considered as the currently displayed page, and the pre-read list may be generated during animation display representing the scrolling by the flick operation.

The above-described processes performed by the CPU 102 may be performed by a plurality of CPUs or may be partially or completely performed by dedicated hardware. Also, a plurality of hardware units may share the processes to control the entire apparatuses.

While the present invention has been described based on its preferred embodiment, the present invention is not limited to the specific embodiment. Rather, the present invention encompasses various embodiments not departing from the spirit of the present invention. Further, the above-described embodiment merely illustrates an example of the present invention, and it is also possible to combine embodiments as appropriate.

In the above embodiment, application of the present invention to the digital video camera has been described by way of example. However, the present invention is not limited to this example. That is, the present invention is applicable to display control apparatuses capable of controlling to simultaneously display a plurality of images. Such display control apparatuses may include a digital camera, a personal computer, a PDA, a mobile phone terminal, a mobile image viewer, a display provided on a printer apparatus for selecting and confirming a print image, and a digital photo frame, for example.

Thus, according to the present invention, a wide range of images can be pre-read in a short time. Therefore, a situation in which no images are displayed can be prevented when the user quickly performs a page switching operation. That is, the user can immediately obtain a hint for estimating the content of the current page being displayed in the screen.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-289654, filed Dec. 21, 2009, which is hereby incorporated by reference herein in its entirety.

What is claimed is:

1. A display control apparatus comprising:
   a display control unit configured to cause a display device to display images stored in a memory unit so that a plurality of images are assigned to each page;
   a changing unit configured to change display from a page being displayed on the display device to another page; and
   a pre-read unit configured to read images to be displayed in a plurality of pages other than the page being displayed from the memory unit and store the read images in a temporary memory unit while the page is being displayed, wherein
   said pre-read unit pre-reads images at intervals with respect to an order for assigning images to each page to be displayed by reading, from the memory unit, a predetermined number of image(s), fewer than the number of images assigned to each page to be displayed, for each of the plurality of pages other than the page being displayed, in ascending order of distance of each page to the page that is being displayed.

2. The apparatus according to claim 1, wherein said pre-read unit reads one image for each of the plurality of pages.

3. The apparatus according to claim 1, wherein images are displayed on each page in an arrangement in an order of an image number associated with each image, and
   said pre-read unit reads images to be displayed at predetermined positions among the images arranged in the order of image number in each page.

4. The apparatus according to claim 1, wherein said pre-read unit reads all images to be completely displayed in pages adjacent to the page being displayed before reading images in other pages.

5. The apparatus according to claim 1, wherein once said pre-read unit finishes a process of reading the predetermined number of image(s) for all the pages other than the page being displayed, said pre-read unit repeats the process in order to read the predetermined number of unread image(s) for the plurality of pages.

6. The apparatus according to claim 5, wherein said pre-read unit first sequentially reads the predetermined number of image(s) fewer than the number of images assigned to each page for each of the plurality of pages other than the page being displayed, in ascending order of distance to the page being displayed, starting from a top image in an image range to be displayed in each page, and then sequentially reads the predetermined number of unread images, starting from a last image in the image range to be displayed in each page.

7. The apparatus according to claim 1, wherein once said pre-read unit finishes reading the predetermined number of image(s) for all the pages other than the page being displayed, said pre-read unit reads all remaining images to be displayed in each page other than the page being displayed, in ascending order of distance to the page being displayed.

8. The apparatus according to claim 1, wherein when the display is changed to another page by said changing unit, said display control unit controls to cause the display device to display images read and stored by said pre-read unit in the temporary memory unit among images to be displayed in the another page.

9. The apparatus according to claim 1, wherein each of the predetermined number of image(s) fewer than the number of images assigned to each page to be displayed are not thumbnails.

10. The apparatus according to claim 1, wherein, when the pre-read unit reads a subset of the predetermined number of image(s) in a first page that exists after or before two or more pages from the page being displayed, the pre-read unit reads a subset of the predetermined number of image(s) in a second page that exist after or before the first page before completion of reading all images in the first page.

11. A control method for a display control apparatus, comprising:
    a display control step of causing a display device to display images stored in a memory unit so that a plurality of images are assigned to each page;
    a changing step of changing display from a page being displayed on the display device to another page; and
    a pre-read step of reading images to be displayed in a plurality of pages other than the page being displayed from the memory unit and storing the read images in a temporary memory unit while the page is being displayed, wherein
    said pre-read step comprises pre-reading images at intervals with respect to an order for assigning images to each page to be displayed by reading, from the memory unit, a predetermined number of image(s) fewer than the number of images assigned to each page to be displayed, for each of the plurality of pages other than the page being displayed, in ascending order of distance to the page being displayed.

12. A non-transitory computer readable medium having stored therein a program for causing a computer to perform the control method for a display control apparatus according to claim 11.

13. The method of claim 11, wherein each of the predetermined number of image(s) fewer than the number of images assigned to each page to be displayed are not thumbnails.

14. The method of claim 11, wherein, when the pre-read step reads a subset of the predetermined number of image(s) in a first page that exists after or before two or more pages from the page being displayed, the pre-read step reads a subset of the predetermined number of image(s) in a second page that exist after or before the first page before completion of reading all images in the first page.

* * * * *